United States Patent
Daman et al.

(10) Patent No.: US 10,049,513 B1
(45) Date of Patent: Aug. 14, 2018

(54) LI-FI INSTRUMENT PANEL, VIRTUALIZATION, AND COACHING

(71) Applicant: HONDA MOTOR., LTD., Minato-ku, Toyko (JP)

(72) Inventors: Laith Daman, Novi, MI (US); Richard Dean Strickland, Mooresville, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/424,462

(22) Filed: Feb. 3, 2017

(51) Int. Cl.
  *H04B 10/116* (2013.01)
  *G07C 5/08* (2006.01)
  *G02B 27/01* (2006.01)

(52) U.S. Cl.
  CPC ....... *G07C 5/0825* (2013.01); *G02B 27/0172* (2013.01); *H04B 10/116* (2013.01); *G02B 2027/014* (2013.01); *G02B 2027/0141* (2013.01)

(58) Field of Classification Search
  CPC ............. G07C 5/0825; H04B 10/116; G02B 27/0172; G02B 2027/0141; G02B 2027/014
  See application file for complete search history.

(56) References Cited

U.S. PATENT DOCUMENTS

| 6,765,495 | B1 | 7/2004 | Dunning et al. |
| 8,890,773 | B1 | 11/2014 | Pederson |
| 9,294,198 | B2 * | 3/2016 | Pederson ............... H04B 10/40 |
| 9,413,457 | B2 * | 8/2016 | Pederson ........... G07C 9/00158 |
| 9,813,150 | B1 * | 11/2017 | Bitra ..................... H04B 10/116 |
| 9,831,950 | B2 * | 11/2017 | Ikehara ................ H04B 10/116 |
| 9,891,756 | B2 * | 2/2018 | Cho ....................... G06F 3/0428 |
| 2009/0171571 | A1 | 7/2009 | Son et al. |
| 2011/0156925 | A1 | 6/2011 | Lee et al. |
| 2013/0018558 | A1 | 1/2013 | Ahn |
| 2014/0064740 | A1 | 3/2014 | Lee et al. |
| 2015/0037039 | A1 | 2/2015 | Chang |
| 2016/0020854 | A1 | 1/2016 | Engel |

FOREIGN PATENT DOCUMENTS

| CN | 101820318 A | 9/2010 |
| CN | 203039692 U | 7/2013 |
| CN | 203933634 U | 11/2014 |
| CN | 104950871 A | 9/2015 |
| CN | 104966415 A | 10/2015 |

(Continued)

OTHER PUBLICATIONS

"Applications of Li-Fi" http://actronuscan.com/ as viewed on Aug. 15, 2016.

(Continued)

*Primary Examiner* — Richard M Camby
(74) *Attorney, Agent, or Firm* — Arent Fox LLP

(57) ABSTRACT

Systems and methods for light fidelity ("Li-Fi") communication of a vehicle are provided. The systems and method may include determining an event associated with the vehicle. The systems and methods may generate, based upon the determined event, a Li-Fi communication specific to a location within the vehicle. The Li-Fi communication may include information based on an operational characteristic of the vehicle. The generated Li-Fi communication may be sent to a wireless device.

18 Claims, 9 Drawing Sheets

(56) References Cited

FOREIGN PATENT DOCUMENTS

| JP | 2014-031135 A | 2/2014 |
| KR | 2012-0134436 A | 12/2012 |
| KR | 2014-0127982 A | 11/2014 |
| KR | 10-1539207 B1 | 7/2015 |
| KR | 2016-0064620 A | 6/2016 |

OTHER PUBLICATIONS

"Vehicle Diagnostics with Your Smart Phone" http://www.lifi-centre.com/about-li-fi/applications/as viewed on Aug. 15, 2016.

* cited by examiner

LI-FI INSTRUMENT PANEL, VIRTUALIZATION, AND COACHING

BACKGROUND

Modern vehicles include complex systems that provide the user and occupants of the vehicle feedback in the form of illumined symbols and lights on the instrument panel. Although some of these illumined symbols may appear similar throughout the vehicle industry (i.e., the symbol for a vehicle's headlights being operational, the symbol for a vehicle's high beams being engaged, the symbol for a power button on a radio etc.), illumined symbols vary among vehicle manufacturers, and even vary among different models by the same vehicle manufacturer. Further, although some of the illumined symbols indicate that the vehicle is operating properly, others require urgent attention by the user to stop damage to the vehicle and/or ensure the safety of the user and occupants of the vehicle.

Understanding vehicle systems and/or symbols may be confusing or frustrating for users. Most vehicle manufacturers offer user guides or manuals in paper form to help users determine the operating procedures and/or meaning of each of the systems and symbols located on the instrument panel. Typically, if a user is not familiar with a system (e.g., the navigation system) or a recently illumined symbol (e.g., oil low warning) on the instrument panel, the user may search the user guides and manuals attempting to determine the operating procedure or meaning. Additionally, even if a user determines the meaning of the illumined symbol (i.e., the yellow light in the shape of an engine means "check engine"), the user may not understand why the vehicle triggers the illumined symbol (e.g., an engine piston is broken). Additionally, even if a user determines the basic operating procedures of a system (i.e., how to turn on the radio), the user may not know how to operate more complex settings (i.e., entering a destination on a navigational system). Further, when operating a vehicle, a user must focus attention to driving rather than reviewing the instrument panel for illumined symbols or operating of systems.

In addition, understanding vehicle instrument panel may be confusing or frustrating for users. In particular, a user who is purchasing a new vehicle from a dealer may be unfamiliar with the vehicle instrument panels, systems and symbols. When purchasing a vehicle, the user generally has little interest in spending additional time with the dealer to understand and learn each of the instrument panel symbols and systems. Further, because the user is generally unfamiliar with the vehicle, the user may not know which symbol indicates an emergency situation, how to properly operate a system, or even review the instrument panel to determine if a symbol is illumined. Customers purchasing new vehicles may complain about the operation of the vehicle and/or return the vehicle back to dealer in order to understand how these systems and illumined symbols should be interpreted.

In view of the foregoing, improvements to vehicle's instrument panel systems and methods would be desirable using light fidelity ("Li-Fi") communication technology. Further advantages will become apparent from aspects of the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

According to one aspect of the present disclosure, a method of Li-Fi communication, includes determining an event associated with the vehicle. The method also includes generating, based upon the determined event, a Li-Fi communication specific to a location within the vehicle, comprising information based on an operational characteristic of the vehicle. The method also includes sending, to a wireless device, the generated Li-Fi communication. The method also includes wherein the wireless device generates, based upon the received Li-Fi communication and a selection on the wireless device by a user, additional information regarding the operational characteristic of the vehicle, and displays the additional information.

According to another aspect of the disclosure, a Li-Fi vehicle based communication system includes a plurality of vehicle monitors that are operable to monitor respective components of a vehicle. The Li-Fi vehicle based communication system also includes a wireless communications interface; a memory; and a processor communicatively coupled to the wireless communications interface and the memory. The processor is configured to determine, from at least one of the plurality of vehicle monitors, an event associated with the vehicle. The processor is configured to generate, based upon the determined event, a Li-Fi communication specific to a location within the vehicle, comprising information based on an operational characteristic of the vehicle. The processor is configured to send, to a wireless device, the generated Li-Fi communication. The Li-Fi vehicle based communication system also includes wherein the wireless device generates, based upon the received Li-Fi communication and a selection on the wireless device by a user, additional information regarding the operational characteristic of the vehicle, and displays the additional information.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further aspects and advances thereof, will be best understood by reference to the following detailed description of illustrative aspects of the disclosure when read in conjunction with the accompanying drawings, wherein:

DETAILED DESCRIPTION

Figure 1A:
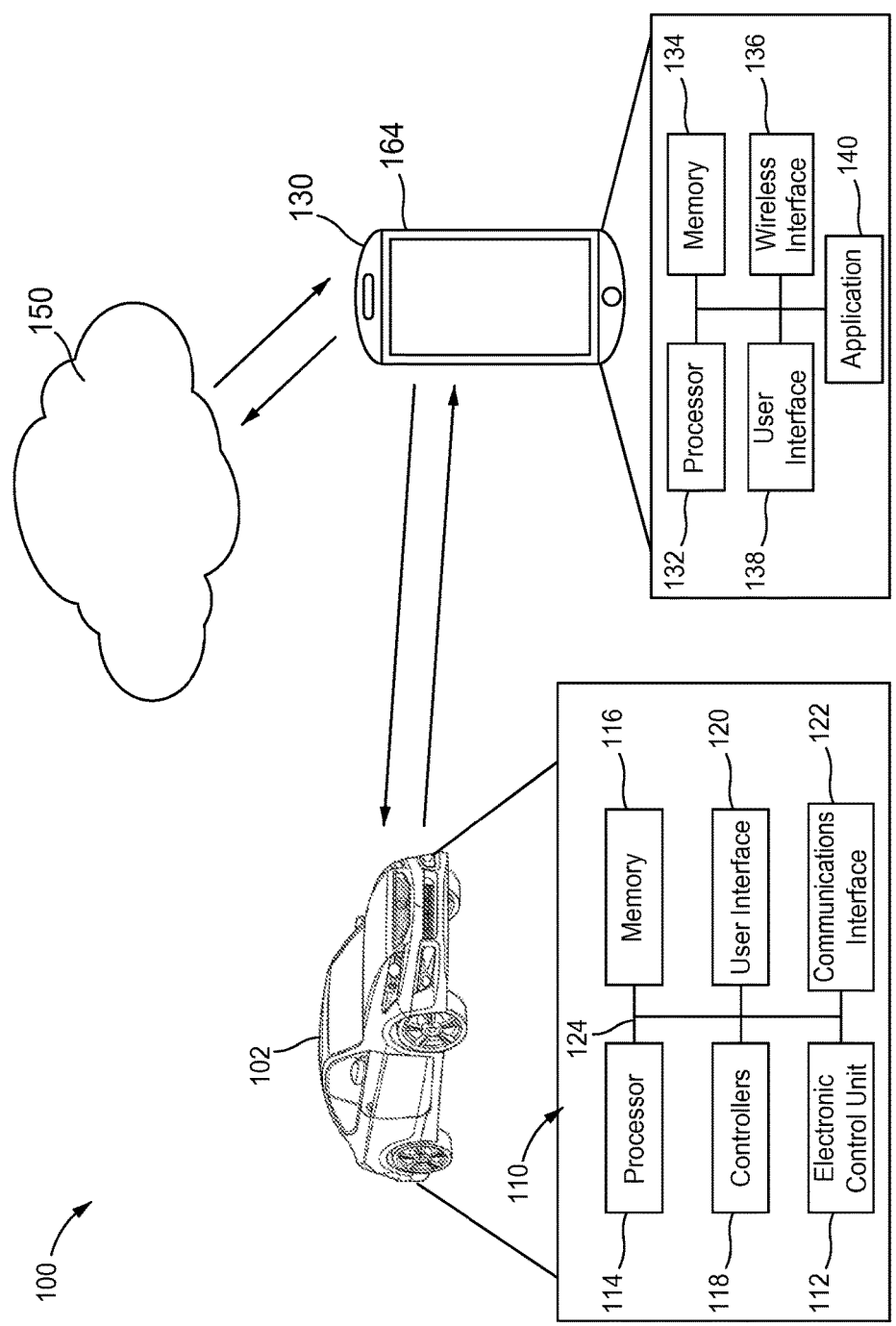
FIG. 1A illustrates a schematic view of an example operating environment of a vehicle based Li-Fi communication system in accordance with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected," is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

A "light fidelity" or "Li-Fi" communication, as used herein, refers to any visible light communication. Li-Fi communication may be a bidirectional, high-speed and fully networked wireless communication technology. Li-Fi may be based on a communication standard, for example, IEEE 802.11. Li-Fi may be transmitted by, for example, light-emitting diodes ("LEDs"). The LEDs may switch off and on at a very high rate, too quick to be noticed by a human eye. The on and off switching may generate a data stream, and unlike the human eye, a Li-Fi receiver is able to receive the data. Although the LEDs may be illumined to a level visible by the human eye, the LEDs may also be dimmed to below human visibility while still emitting enough light to carry the data.

Generally described, aspects of the present disclosure provide for a Li-Fi based vehicle instrument panel allowing virtualization and coaching. That is, the user of a vehicle is able obtain information regarding systems and operations of a vehicle via Li-Fi communication. In an aspect, in response to the user receiving a Li-Fi signal from the vehicle instrument panel, the user is able to determine the meaning of a specific symbol, obtain additional information regarding the vehicle operation, and determine, via a plurality of resources, if the vehicle is safe to operation. In another aspect, the user may connect to additional resources, instructions or user guides on how to operate specific systems within the vehicle. Further, in another aspect, a Li-Fi based vehicle instrument panel may be transmitted to a wireless device display within the line-of-sight of a user.

The system and method of an aspect of the present disclosure may allow a user of the vehicle to conveniently and gradually learn/understand components of the vehicle, for example, the instrument panel of the vehicle, headlights, taillights, and the engine, and become more familiar with the vehicle features. Instead of having to navigate through manuals or menus and attempt to understand systems, devices, components, and symbols, the user may use a wireless device to receive the Li-Fi communication from discrete areas within an instrument panel or area of the vehicle. The received Li-Fi communication may prompt the user with questions, definitions, videos, diagrams, and the like, to help coach the user through a wide variety of vehicle systems, faults and symbols and related messages and interpretations.

Additionally, the disclosed system and method may allow a user of a vehicle to conveniently and safely view the instrument panel through a wearable device. Instead of having to constantly look down at the instrument panel during operation of a vehicle for visual indications (e.g., speed, warning symbols, navigational directions), the user may use a wearable device to receive Li-Fi communications that virtualize the instrument panel for the user.

Turning to FIG. 1A, a schematic view of an example operating environment 100 of a vehicle based Li-Fi communication system 110 and example methods according to aspects of the disclosure are provided. The vehicle based Li-Fi communication system 110 may reside within vehicle 102. The vehicle 102 and/or vehicle based Li-Fi communication system 110 may communicate with a wireless device 130. In an aspect, the wireless device 130 may include any device capable of wireless communication with vehicle based Li-Fi communication system 110 such as, but not limited to, a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similarly functioning device. In an aspect, a resource center 150 may be an online service that that provides information and/or connectivity to the internet. In an aspect, the resource center 150 may be a cloud service hosted by one or more computer servers or virtual servers. The components of the vehicle based Li-Fi communication system 110, as well as the components of other systems (e.g., wireless device 130 and resource center 150), hardware architectures, and software architectures discussed herein, may be combined, omitted or organized into various implementations.

The vehicle 102 may generally include an electronic control unit (ECU) 112 that operably controls a plurality of vehicle systems. The vehicle systems may include, but are not limited to, the vehicle based Li-Fi communication system 110, among others, as well as vehicle HVAC systems, vehicle audio systems, vehicle video systems, vehicle infotainment systems, vehicle telephone systems, and the like. The various vehicle systems may be associated with one or more controllers 118 for controlling the vehicle systems. In some variations, the one or more controllers 118 control the vehicle systems via the ECU 112. The vehicle based Li-Fi communication system 110 may also include a processor 114 and a memory 116 that communicate with the ECU 112, controllers 118, a user interface 120 and a communications interface 122 via a bus 124.

The ECU 112 may include an internal processing memory, an interface circuit, and bus lines for transferring data, sending commands, and communicating with the vehicle systems. The ECU 112 may include an internal processor and memory (not shown). The vehicle 102 may also include the bus 124 for sending data internally among the various components of the vehicle based Li-Fi communication system 110.

The controllers 118 may include any controls by which the user interacts with the vehicle 102, physically, visually or via audio. Example controllers include buttons, switches, knobs, dials, wheels, pedals, the steering wheel, headlights, taillights, engine components, fluid reservoirs, and gear selector, among others. The controllers may also include external devices such as remote entry buttons or key fobs, and a receiver for communication with such external devices. In an aspect, the controllers 118 are associated with the Li-Fi communication system 110. For example, a window control switch may be backlit by LEDs associated with the Li-Fi communication system 110 and may provide a Li-Fi communication signal. For another example, a fluid reservoir, such as one containing windshield washer fluid, may emit a Li-Fi communication signal via LEDs associated with the Li-Fi communication system 110. For another example, the headlight may employ LEDs, associated with the Li-Fi communication system 110, and may provide a Li-Fi communication signal along with illumination for the driver of the vehicle.

The user interface 120 may include a system for receiving input and presenting output for the vehicle based Li-Fi communication system 110. In an aspect, the user interface 120 may include a computer display (e.g., an LCD screen), speakers for output, and a touch input, buttons, dials, keyboard, or other features for input. The user interface 120 may be integrated with a vehicle infotainment system. For example, a user may select a menu option or press a dedicated button to activate the vehicle based Li-Fi communication system 110. The user interface 120 may also include a vehicle gauge cluster comprising a plurality of symbols/icons. The user interface 120 may allow the user to visually receive information, select options through a menu system and provide a Li-Fi communication signal.

The communications interface 122 (e.g., Li-Fi transmitter, wireless modem) may provide wired or wireless computer communications utilizing various protocols to send/receive electronic signals internally with respect to features and systems within the vehicle 102 and with respect to external devices (e.g., wireless device 130). These protocols may include a wireless system utilizing Li-Fi, radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications interface 122 of the vehicle 102 may be operably connected for internal computer communication via a bus (e.g., a CAN or a LIN protocol bus) to facilitate data input and output between the ECU 112 and vehicle features and systems.

The wireless device 130 may include any device capable of wireless communication with the vehicle based Li-Fi communication system 110. In an aspect, the wireless device 130 may include a processor 132, a memory 134, a wireless interface 136, a user interface 138, a Li-Fi receiver 164, and an application 140. The processor 132 may execute computer executable instructions stored in memory 134. For example, the application 140 may include a set of instructions stored in memory 134 that are executed by the processor 132. The wireless interface 136 may provide wireless computer communications utilizing various protocols to send/receive electronic signals with respect to external devices (e.g., vehicle 102 and resource center 150). These protocols may include a wireless system utilizing, Li-Fi, radio-frequency (RF) communications (e.g., IEEE 802.11 (Wi-Fi), IEEE 802.15.1 (Bluetooth®)), a near field communication system (NFC) (e.g., ISO 13157), a wireless local area network (WLAN), a wireless wide area network (WWAN) (e.g., cellular) and/or a point-to-point system. The user interface 138 may include a system for receiving input and presenting output for the wireless device 130. In an aspect, the user interface 138 may include a display (e.g., an LCD screen) and speakers for output and a touch input, buttons, dials, keyboard, or other features for input. For example, the wireless device 130 may be a smart phone including a touch screen for both input and output, or additionally, the wireless device 130 may be a wearable device including a near eye display for output and a control portion for input.

In an aspect, the application 140 may be a user installed application corresponding to the vehicle 102 or the resource center 150. For example, the manufacturer of the vehicle 102 or the provider of the resource center 150 may provide the application 140 to users of the vehicle 102 (e.g., through a digital distribution service). The application 140 may be stored in the memory 134 and executed by the processor 132. Further, the application 140 may store user options in the memory 134. The application 140 may display output to the user interface 138 and receive input from the user interface 138. Additionally, the application 140 may communicate with external devices via the wireless interface 136. For example, the application 140 may directly communicate with the vehicle based Li-Fi communication system 110 to receive Li-Fi communication signals and send response signals. The application 140 may also communicate with the resource center 150 to obtain information regarding the Li-Fi communication signal of the vehicle based Li-Fi communication system 110.

The resource center 150 may be a remote service that comprises and provides in-depth information regarding the vehicle 102. The resource center 150 may be a cloud service that is hosted by one or more servers or virtual servers. The resource center 150 may include user guides, manuals, instructions, videos, audio files, and similar formats of information regarding the vehicle 102. For example, the resource center may transmit, via the application 140, a step-by-step instructional video to a user regarding how to perform an oil change based upon the received Li-Fi communication signal regarding the vehicle 102. The resource center 150 may also have access to the internet and the ability to request additional information regarding the vehicle 102. For example, the resource center may crowd source an answer to questions from a user based upon the received Li-Fi communication signal regarding the vehicle 102 (i.e., "is it safe for me to operate my vehicle with the check engine light illumined"?). Additionally, the resource center may be in operable connection with the vehicle manufacturer dealer network. The resource center 150 may contact a user via the application 140 to automatically schedule required vehicle maintenance, and the resource center 150 may contact the dealer network to schedule an unforeseen maintenance appointment initiated by the user. Additionally, the resource center 150 may contact the dealer network to order specific vehicle parts, for example, a water pump or air filter, prior to a user scheduling or arriving for a vehicle maintenance appointment. The dealer network may also provide feedback, via the resource center 150 and the application 140, alerting the user whether the maintenance appointment is imperative or routine.

In operation, the vehicle based Li-Fi communication system 110 may detect an event relating to vehicle 102. Some examples of a detected event may be starting the vehicle 102, engine failure, accelerating, braking, turning on the infotainment screen, adjusting the windows, turning on headlights, operability of a vehicle component, etc. Additionally, an event may include activation of any controller 118 or the user interface 120.

In one aspect, the ECU 112 may determine, for example, that a dangerous event has occurred and that the engine in vehicle 102 is on the verge of overheating because of a lack of coolant. The ECU 112 may trigger the user interface 120 to illuminate a symbol 160 (e.g., check engine light) located within the gauge cluster. The ECU 112 may also trigger the backlit LEDs, in addition to illuminating the symbol, to transmit a Li-Fi communication signal indicating that the engine is about overheat based on a lack of coolant. Although the user only visually sees the illumined symbol 160, the user is able to use wireless device 130 to receive the Li-Fi communication signal via a Li-Fi receiver 164. The wireless device may access application 140 to request more information regarding the illumined symbol 160. The wireless device may provide the user with information indicating that the engine is about to overheat based upon a lack of coolant. Additionally, if the application 140 fails to retrieve more information, or determine whether it is safe to operate the vehicle, the application 140 may access the resource center 150 to request such information. Further, if the resource center 150, fails to retrieve more information or determine whether it is safe to operate the vehicle, the resource center 150 may contact the dealer network or crowd source other users as to the meaning of the Li-Fi communication signal.

In another aspect, the ECU 112 may determine, for example, that an event has occurred and that the engine in the vehicle 102 is on the verge of failure. The ECU 112 may trigger the user interface 120 to illuminate a symbol 160 (e.g., check engine light) located within the gauge cluster. The ECU 112 may also trigger the backlit LEDs, in addition to illuminating the symbol, to transmit a Li-Fi communication signal indicating that the engine is about fail based on an unknown problem. Although the user only visually sees the illumined symbol 160, the user is able to use wireless device 130 to receive the Li-Fi communication signal via a Li-Fi receiver 164. The wireless device may access application 140 to request more information regarding the illumined symbol 160. The wireless device may provide the user with information indicating that the engine is about to fail and to visually scan a specific portion of engine with the wireless device 130, for example, the pistons located in the engine. The wireless device 130, may provide instructions, both visually and/or audibly, to the user to determine the location of the specific portion of the engine to scan. The specific portion of the engine, for example, the pistons, may emit a Li-Fi communication signal containing information, for example, piston timing, combustion ratio, air flow, etc. The Li-Fi communication signal may provide live diagnostic data of a specific engine portion. Additionally, the application 140 may access the resource center 150 to transmit the live diagnostic data. Further, the resource center 150 may contact the dealer network or crowd source other users as to the meaning of the Li-Fi communication signal.

Additionally, a user may attempt to learn more about the vehicle, and may opt to scan different specific portions of the vehicle emitting a Li-Fi communication signal to gain knowledge concerning the vehicle. For example, a user may desire to learn the type of fluids contained in each of the fluid reservoirs located within the engine compartment. The user may use wireless device 130 to receive the Li-Fi communication signal via a Li-Fi receiver 164 emitted from, for example, the power steering fluid reservoir. The Li-Fi communication signal may allow the user to determine the specific power steering fluid to buy, e.g., the model number, or the amount of fluid contained within the reservoir, e.g., ¾ full.

In another aspect, the ECU 112 may determine that the event of starting the vehicle 102 has occurred, for example, all systems are running properly. The ECU 112 may trigger the controller 118 to illuminate the radio, for example, located within the instrument panel. In addition, the ECU 112 may also trigger the backlit LEDs to transmit a Li-Fi communication signal indicating that the controller 118 is a radio. Although the user only visually sees the radio illumined by controller 118, the user may use the wireless device 130 to receive the Li-Fi communication signal via a Li-Fi receiver 164. The wireless device may access the application 140 to request more information regarding the illumined controller 118. The wireless device may act as a human machine interface ("HMI") to provide the user with instructional tutorials on how to use the controller. Additionally, if the application 140 fails to retrieve more information or access the operational aspects of the controller, the application 140 may access the resource center 150 to request such information. Further, if the resource center 150, fails to retrieve more information or access the operational aspects of the controller, the resource center 150 may contact the dealer network or crowd source other users as to the meaning of the Li-Fi communication signal.

In another aspect, the ECU 112 may determine that the event of starting the vehicle 102 has occurred, for example, and all systems are running either operating properly or failing. The ECU 112 may trigger the user interface 120 and/or the controllers 118 to illuminate (e.g., radio, gauges, and symbols) located within the instrument panel. In addition, the ECU 112 may also trigger the backlit LEDs to transmit a Li-Fi communication signal indicating information (e.g., speed, headlights operational, turn signals activated) from the user interface 120 and controllers 118. Although the user only visually sees the illumined controller 118 and the user interface 120, the user may use the wireless device 130 to receive the Li-Fi communication signal via a Li-Fi receiver 164. The wireless device may virtualize the instrument panel on a display. The user may visualize the instrument panel without directly viewing the controllers 118 and user interface 120.

Figure 1B:
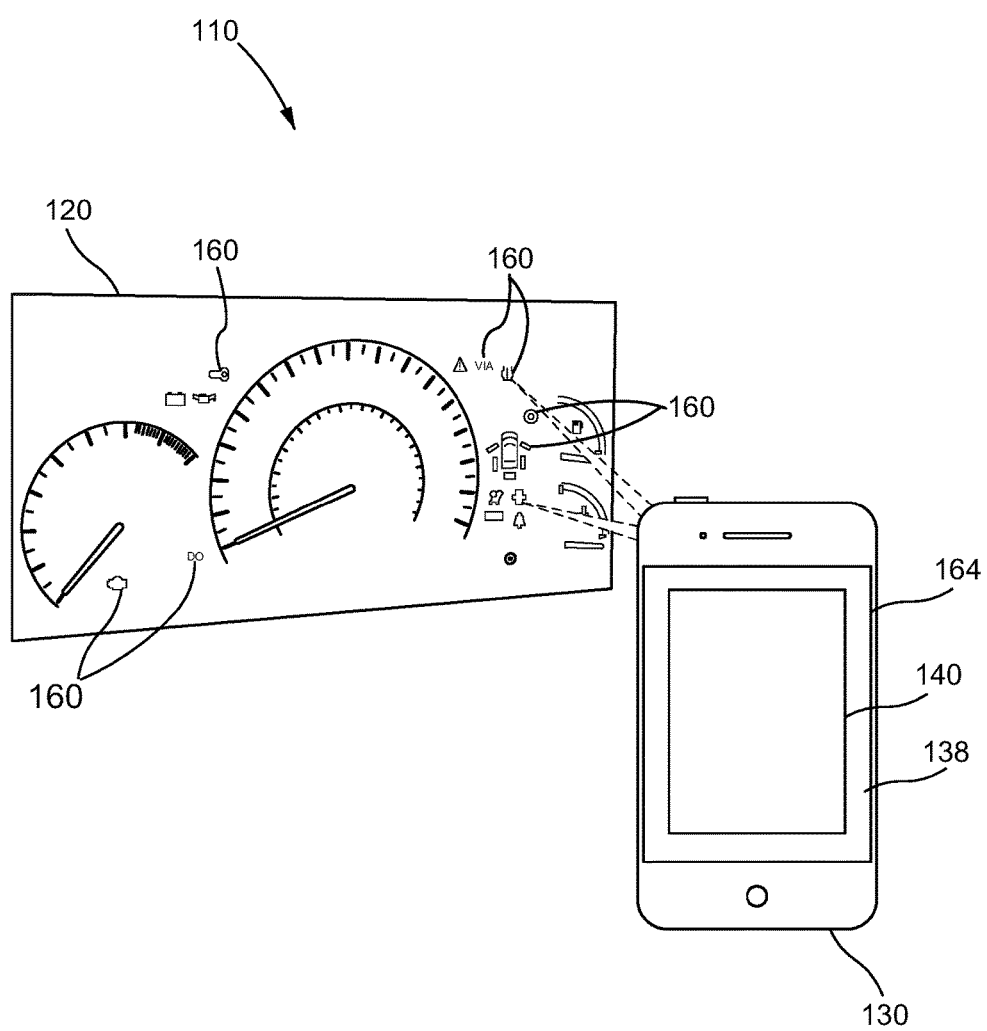
FIG. 1B illustrates a schematic view of an example of a vehicle based Li-Fi system in accordance with aspects of the present disclosure.

FIG. 1B illustrates a schematic view of an example of a vehicle based Li-Fi system 110 in accordance with aspects of the present disclosure. In one aspect, the wireless device 130 may receive the Li-Fi communication signal generated by the user interface 120. Further, the Li-Fi communication signal may be received by the wireless device 130, via a Li-Fi receiver 164. For example, the Li-Fi receiver 164 may be a camera. Additionally, the Li-Fi receiver may receive the Li-Fi communication signal generated by the back lit LEDs of symbols 160. The symbols 160 may be universal vehicle gauge symbol or proprietary symbols, for example. The wireless device 130 includes the user interface 138 and displays the application 140 via user interface 138. Features of the application 140, in accordance with aspects of the present disclosure, will be explained in detail below.

Figure 1C:
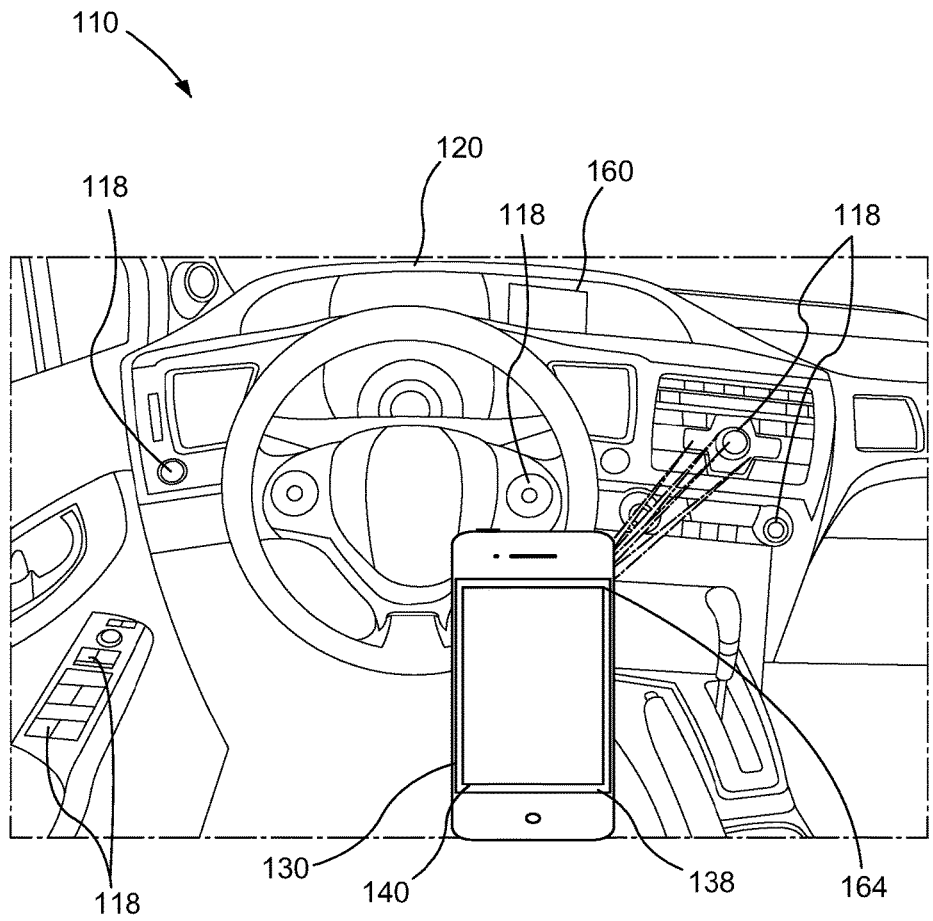
FIG. 1C illustrates a schematic view of an example of a vehicle based Li-Fi system in accordance with aspects of the present disclosure.

FIG. 1C illustrates a schematic view of an example of a vehicle based Li-Fi system 110 in accordance with aspects of the present disclosure. In one aspect, the wireless device 130 may receive the Li-Fi communication signal generated by the user controllers 118. Further, the wireless device 130 may receive the Li-Fi communication signal, via a Li-Fi receiver 164. For example, the Li-Fi receiver 164 may be a camera. Additionally, the Li-Fi receiver may receive the Li-Fi communication signal generated by the back lit LEDs of the controllers 118. Further, the Li-Fi receiver may receive the Li-Fi communication signal generated by the back lit LEDs of symbols 160. The symbols 160 may be universal vehicle gauge symbol or proprietary symbols, for example. The wireless device 130 displays the application 140 via user interface 138. Features of the application 140 in accordance with aspects of the present disclosure, will be explained in detail below.

Figure 2A:
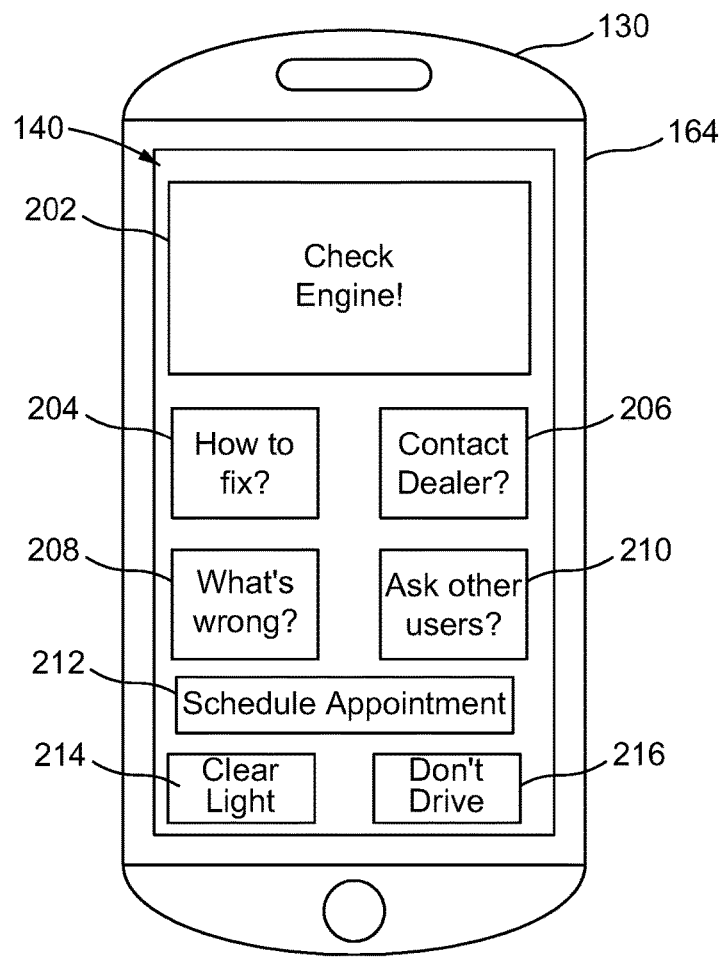
FIG. 2A illustrates an example of a portion of a vehicle based Li-Fi system providing assistance on a wireless device in accordance with aspects of the present disclosure.

FIG. 2A illustrates an example of a wireless device 130 providing information to a user based on an event. In one aspect, the wireless device 130 may provide the information via the application 140. The application may be displayed on the user interface 138. In an aspect, the user may receive the Li-Fi communication signal via receiver 164 based on the controllers 118 or the user interface 120. The application may include a notification 202, control options 204, 206, 208, 210, 214, a status option 216 and a maintenance request button 212, for example. The notification 202 may display information regarding the received Li-Fi communication signal. For example, the illustrated notification 202 may be in response to the "check engine" symbol 160 illumined on the user interface 120, and received and processed by the wireless device 130. The default option may be to determine and present the notification 202 via the application 140 on the wireless device 130. Alternatively, the application 140 may contract the resource center 150, or additional users for additional information or confirmation. It should be appreciated that the notification may be presented in various manners. For example, the notification 202 may be presented audibly as a recorded message or text-to-voice. As another example, the notification 202 may include images, animations, or videos illustrating the notification.

The control options 204, 206, 208, 210, 214, status option 216 and maintenance request button 212 may correspond to the set of options available for the specific notification 202. It should be apparent that the number and type of options may vary based on the specific notification, the available information and the severity of the event. In the illustrated example, the control options 204, 206, 208, 210, 214, the status option 216 and the maintenance request button 212 correspond to the notification of "Check Engine." Control option 204 may be to request additional information on how to fix the vehicle, control option 206 may be to contact the dealer of the vehicle via text messaging voice/data call etc., control option 208 may be to provide additional information to the user regarding what part of the engine needs to be checked, control option 210 may be to crowd source additional information (i.e., does this notification on this vehicle occur often?), maintenance request button 212 may be to schedule an appointment at the dealer to have the vehicle serviced, and control option 214 may be to clear or disable the illumined symbol 160. Each of the control options 204, 206, 208, 210, 212 may have additional sub-options upon selection. In an aspect, status option 216 may be highlighted to indicate the severity of the notification 202, and control option 214 may be disabled based upon the severity of the notification 202. For example, if the engine of the vehicle is without coolant and may be severely damaged by continuous use, status option 216 may be highlighted and the control option 214 may be disabled. In contrast, if the dome light of the vehicle interior has burned out, status option 216 may not be highlighted and the control option 214 may be enabled.

Figure 2B:
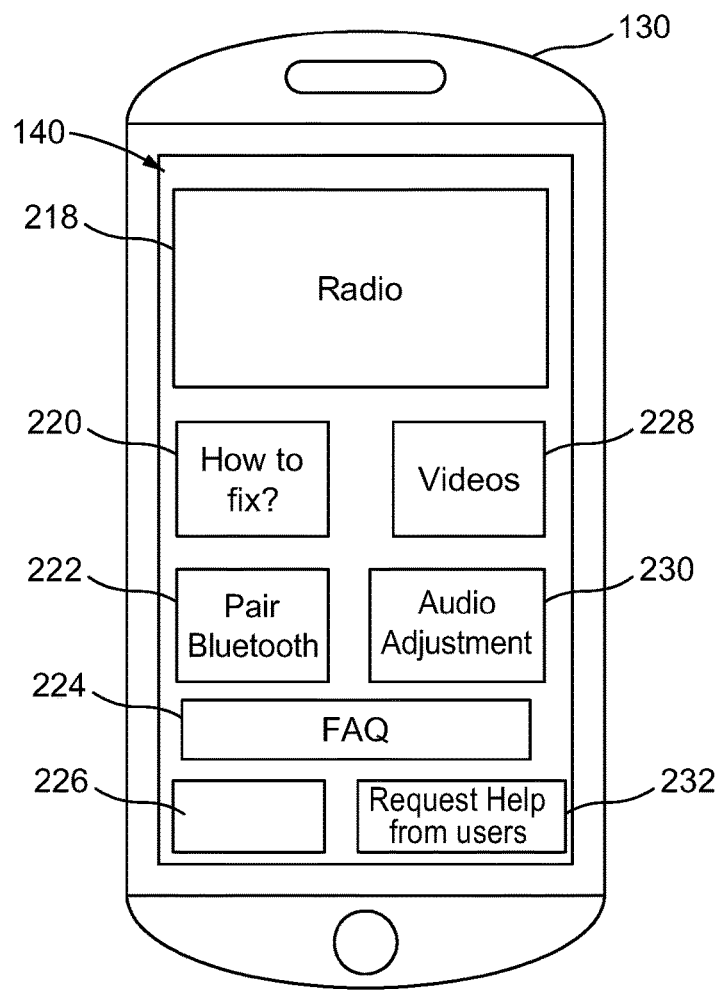
FIG. 2B illustrates an example of a portion of a vehicle Li-Fi system providing coaching on a wireless device in accordance with aspects of the present disclosure.

FIG. 2B illustrates an example of a wireless device 130 providing information to a user based on an event. In one aspect, the wireless device 130 may provide the information via application 140. The application may be displayed on the user interface 138. In an aspect, the user may receive the Li-Fi communication signal via receiver 164 based on the controllers 118 or the user interface 120. The application may include an identification of the system 218, control options 220, 222, 224, 226, 228, 230 and 232. The identification of the system 218 may display information regarding the received Li-Fi communication signal. For example, the illustrated identification of the system 218 may be in response to the user receiving the Li-Fi communication signal from back lit LEDs of the radio from the controller 118, which is received and processed by the wireless device 130. The default option may be to determine and present the identification of the system 218 via the application 140 on the wireless device 130. Alternatively, the application 140 may contact the resource center 150, or additional users for additional information or confirmation. It should be appreciated that the notification may be presented in various manners. For example, the identification of the system 218 and the control options 220, 222, 224, 226, 228, 230 and 232 may be presented audibly as a recorded message or text-to-voice. As another example, the identification of the system 218 and the control options 220, 222, 224, 226, 228, 230 and 232 may include images, animations, or videos illustrating the notification.

The control options 220, 222, 224, 226, 228, 230 and 232 may correspond to the set of options available for the specific identification of the system 218. It should be apparent that the number and type of options may vary based on the specific system, the available information and the complexity of the system. In the illustrated example, the control options 220, 222, 224, 226, 228, 230 and 232 correspond to the notification of "Radio." Control option 220 may be a tutorial for the radio, control option 222 may provide instructions on how to pair a Bluetooth® device, control option 224 may provide answers to frequently asked questions, control option 228 may provide instructional videos regarding the radio, control option 230 may provide assistance with audibly tuning the radio, control option 232 may be for crowd sourcing additional information (i.e., "does radio constantly turn on and off?"), and in this example control option 226 may be left blank. In other aspects, the more complex the selected system is, the more control options may be present. For example, the selection of the infotainment system may have a plurality of pages and control options. Each of the control options 220, 222, 224, 226, 228, 230 and 232 may have additional options upon selection.

Figure 3:
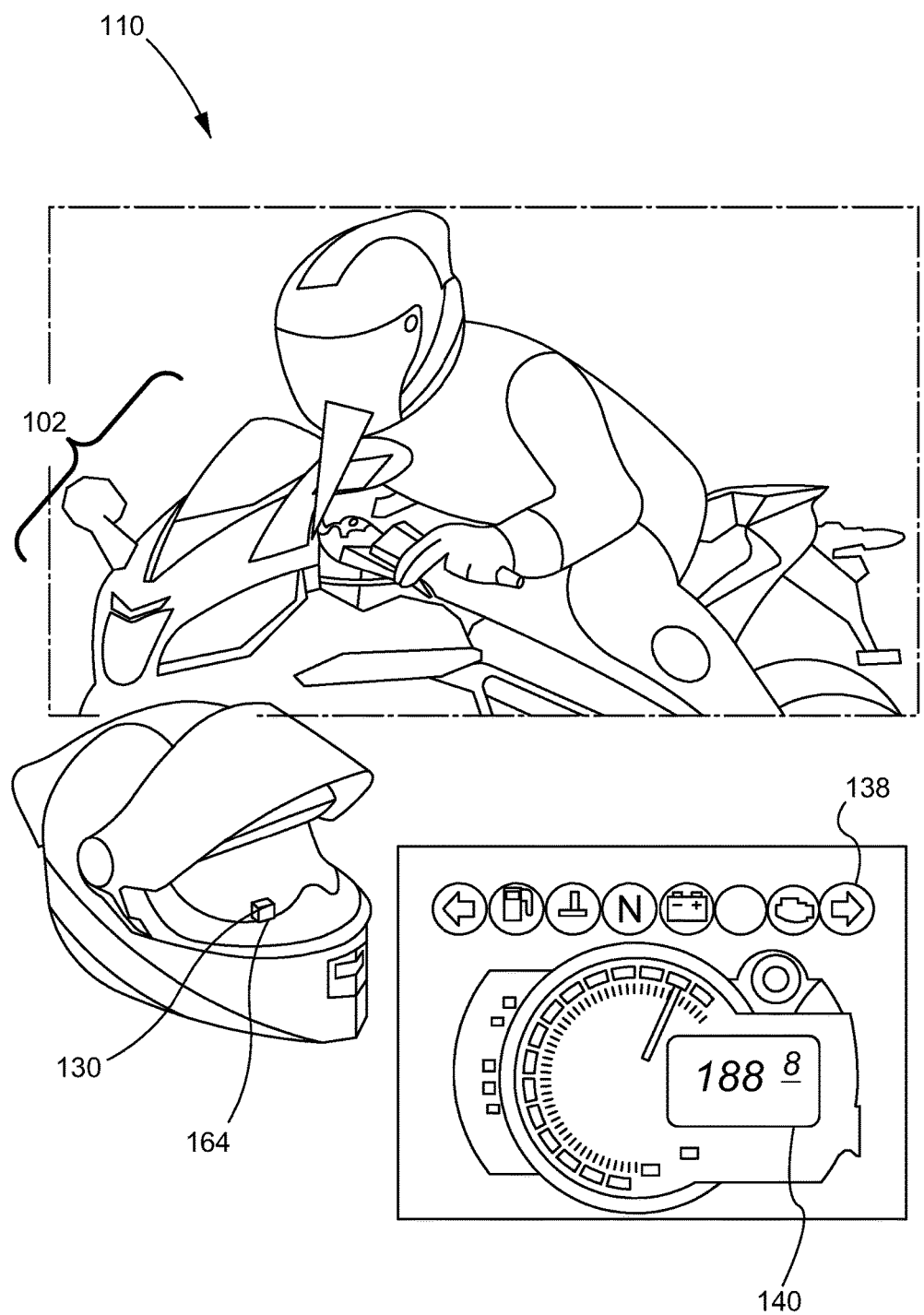
FIG. 3 illustrates an example of vehicle instrument panel virtualization on a wireless device in accordance with aspects of the present disclosure.

FIG. 3 illustrates an example of a wearable wireless device 130 providing information to a user based on an event. In one aspect, a wearable wireless device 130 receives a plurality of Li-Fi communication signals from the vehicle based Li-Fi communication system 110. The user may receive, via Li-Fi receiver 164, both Li-Fi communication signals from the controllers 118 and the user interface 120 (not shown). The wireless device 130 may virtualize the instrument panel of the vehicle, and provide the virtualized instrument panel to the user via user interface 138 and application 140. The wireless device 130 may also contain a near eye display ("NED") to allow the user to wear the wireless device 130, view the virtualized instrument panel, yet partially retain the user's field of vision. For example, the NED may be a monocle display. Additionally, audible instructions may be provided to the user via headphone or an earpiece.

Figure 4:
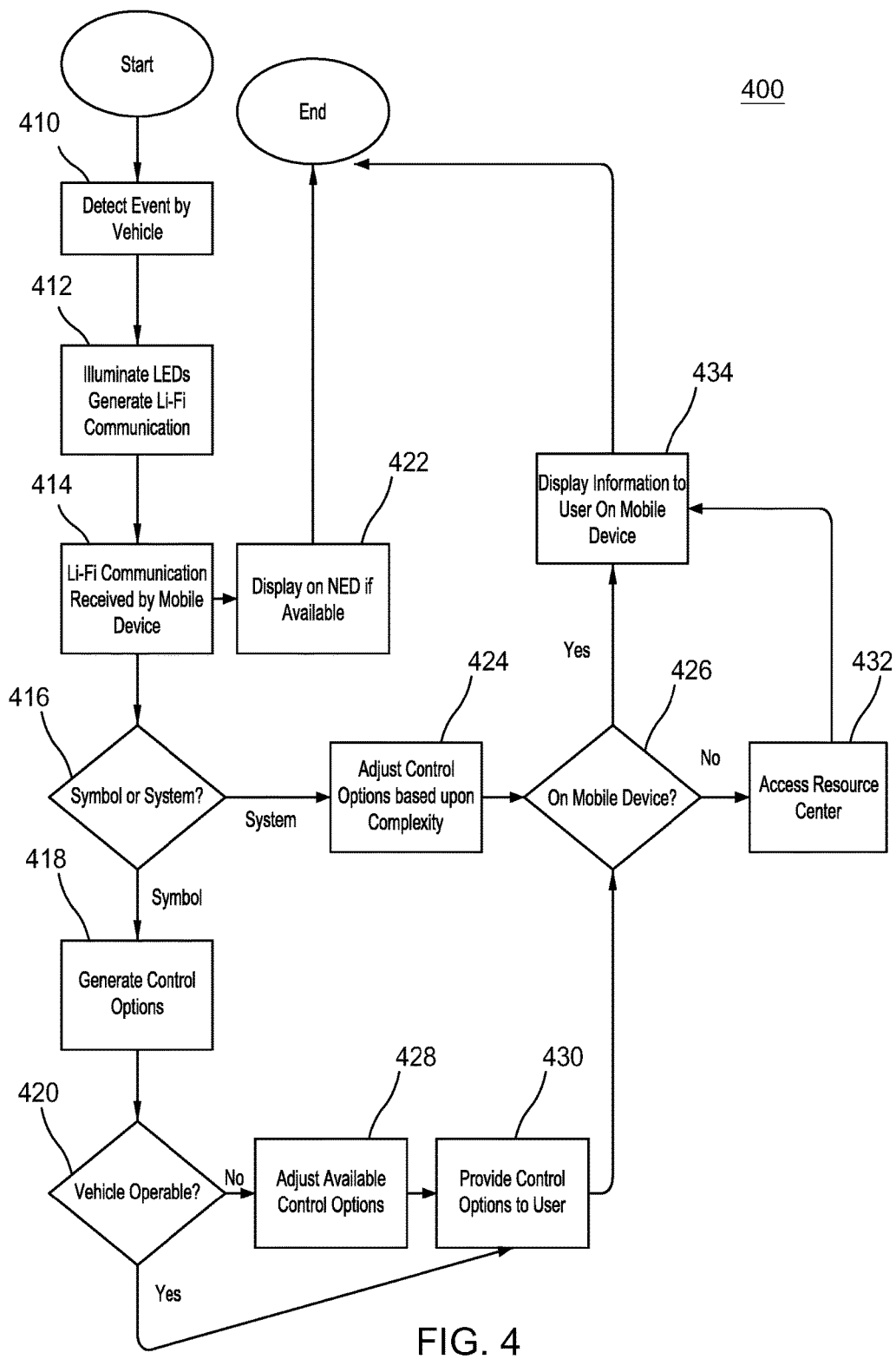
FIG. 4 illustrates a flowchart showing a method for a vehicle based Li-Fi system in accordance with aspects of the present disclosure.

FIG. 4 illustrates a flowchart of an example method 400 for Li-Fi communication of a vehicle. The method 400 may be performed by a vehicle based Li-Fi communication system 110 within a vehicle 102.

At block 410, the method 400 may include detecting an event. As discussed above, the ECU 112 may detect an event in response to activation of a controller 118 by a user of the vehicle 102, the starting of the vehicle 102, or a failure of a system of a vehicle. At block 410, the ECU 112 and/or processor 114 may determine whether an event has been detected. If an event has been detected, the ECU 12 may trigger the LEDs within the vehicle to illuminate and generate Li-Fi communication signals. The LEDs may back light both the controllers 118 and the user interface 120. At block 414, a user may use wireless device to receive the Li-Fi communication signal(s). The user may place the Li-Fi receiver in a position to receive signals from specific controllers 118 and/or symbols 160 included within the user interface 120.

In block 422, if a the wireless device includes a NED, the received Li-Fi signals may be processed by the processor 132, and a virtualized instrument panel is displayed on the NED. For example, the user may see on the virtualizes instrument panel relating to symbols, gauges, information and warnings. The processed Li-Fi signals may also provide audio to the user, for example, warnings and navigational instructions.

The method 400 may proceed to block 416 where the wireless device 130 and the processor 132 may determine if the received Li-Fi signal was generated by controller 118 or user interface 120. Li-Fi communication signals generated by controllers may provide tutorials directed to the vehicle systems, while, Li-Fi communication signals generated by the user interface 120 may provide warnings pertaining to the vehicle 102.

In block 424, if the Li-Fi communication signals are based on controller 118, the wireless device 130 may adjust the control options provided on the wireless device to the user. For example, the control options and controllers 118 are explained above in reference to at least FIGS. 1A, 1C and 2B.

In block 418, if the Li-F communication signals are based on the user interface 120, the wireless device 130 may generate the control options provided on the wireless device to the user. For example, the control options 118 and the user interface 120 are explained above in reference to at least FIGS. 1A, 1B and 2A. Further, blocks 420, 428 and 430 are also explained above in reference to at least FIGS. 1B and 2A.

In block 426, the wireless device 130 may determine, based upon the selected control option by the user, if the information requested information is contained with the application 140 of the wireless device 130. If the information requested by the user based upon the selected control options is not available on the wireless device 130, the wireless device may access the resource center 150. The resource center 150, and the applicable steps are explained above in reference to at least FIG. 1A.

In block 434, the wireless device 130 displays the requested information to the user.

Figure 5:
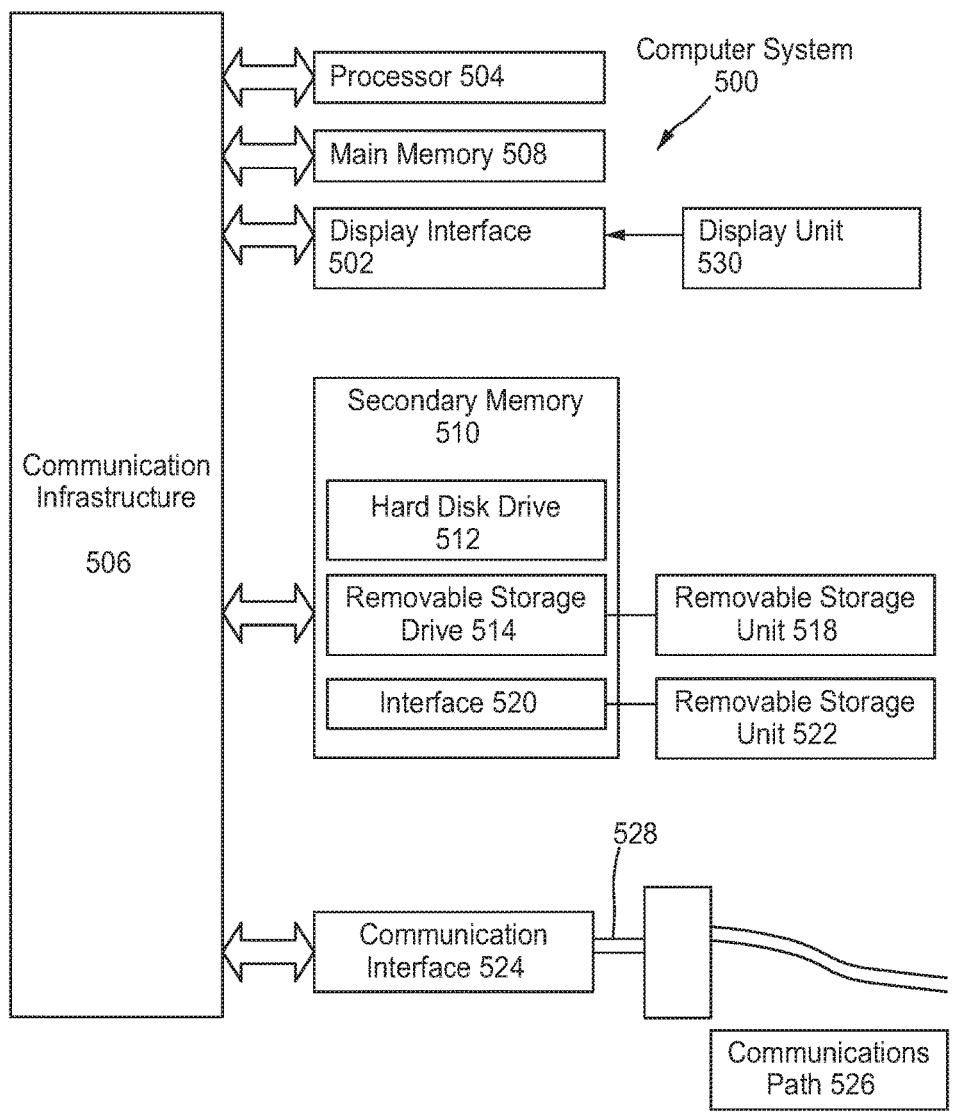
FIG. 5 presents an example system diagram of various hardware components and other features for use in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 5 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 500 is shown in FIG. 5.

Computer system 500 includes one or more processors, such as processor 504. The processor 504 is connected to a communication infrastructure 506 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 500 may include a display interface 502 that forwards graphics, text, and other data from the communication infrastructure 506 (or from a frame buffer not shown) for display on a display unit 530. Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well-known manner. Removable storage unit 518, represents a floppy disk, magnetic tape, optical disk, etc., which is read by and written to removable storage drive 514. As will be appreciated, the removable storage unit 518 includes a computer usable storage medium having stored therein computer software and/or data.

In alternative aspects, secondary memory 510 may include other similar devices for allowing computer programs or other instructions to be loaded into computer system 500. Such devices may include, for example, a removable storage unit 522 and a communications interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and communications interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528, which may be electronic, electromagnetic, optical or other signals capable of being received by communications interface 524. These signals 528 are provided to communications interface 524 via a communications path (e.g., channel) 526. This path 526 carries signals 528 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 580, a hard disk installed in hard disk drive 570, and signals 528. These computer program products provide software to the computer system 500. Aspects of the disclosure are directed to such computer program products.

Computer programs (also referred to as computer control logic) are stored in main memory 508 and/or secondary memory 510. Computer programs may also be received via communications interface 524. Such computer programs, when executed, enable the computer system 500 to perform various features in accordance with aspects of the present disclosure, as discussed herein. In particular, the computer programs, when executed, enable the processor 504 to perform such features. Accordingly, such computer programs represent controllers of the computer system 500.

In variations where aspects of the disclosure are implemented using software, the software may be stored in a computer program product and loaded into computer system 500 using removable storage drive 514, hard disk drive 512, or communications interface 520. The control logic (software), when executed by the processor 504, causes the processor 504 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 6:
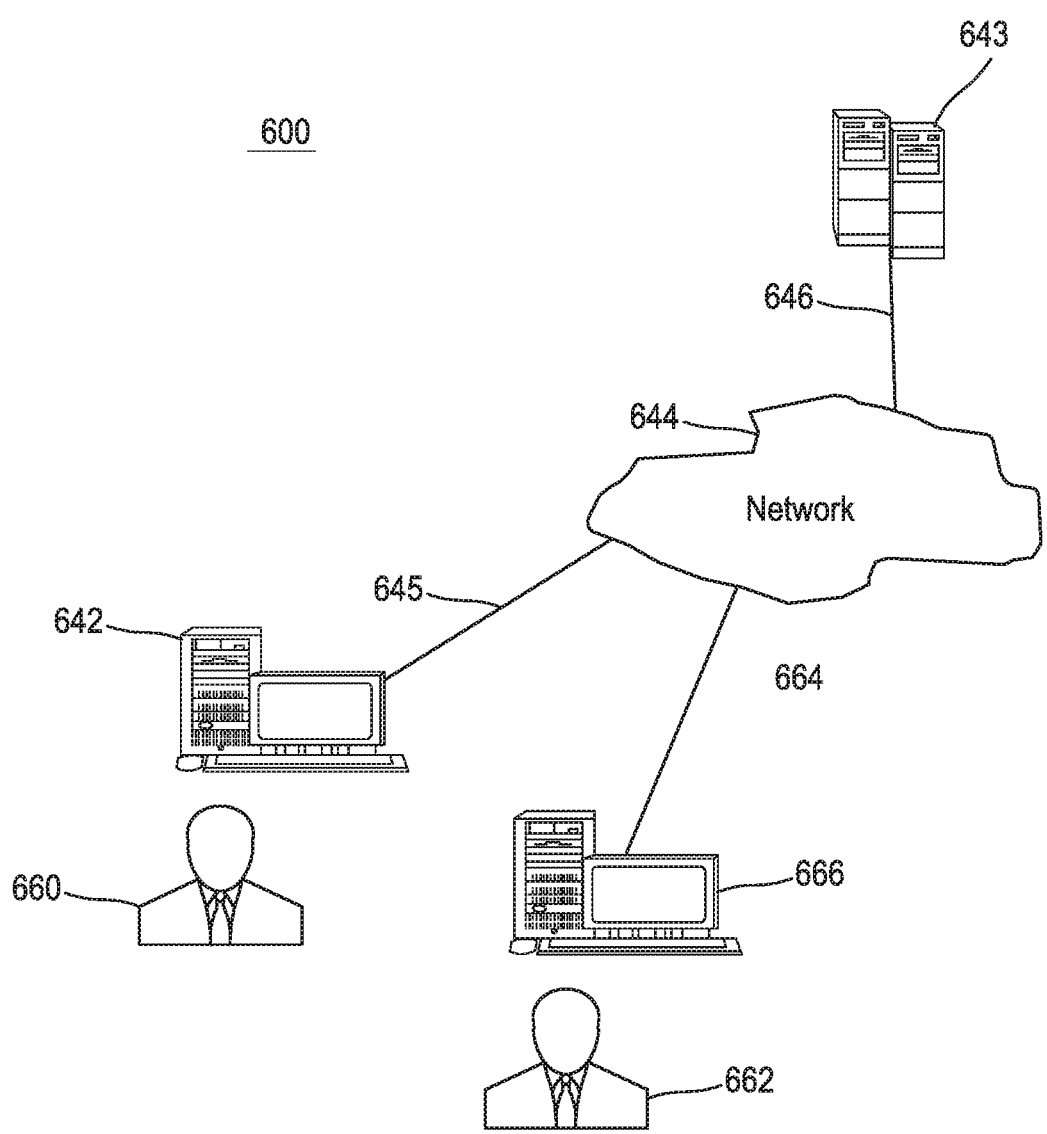
FIG. 6 is a block diagram of various example system components for use in accordance with aspects of the present disclosure.

FIG. 6 is a block diagram of various example system components that may be used in accordance with aspects of the present disclosure. For example, the various components may be within the vehicle 102, or only some of the components may be within the vehicle 102, and other components may be remote from the vehicle 102. The system 600 includes one or more accessors 660, 662 (also referred to interchangeably herein as one or more "users") and one or more terminals 642, 666 (such terminals may be or include, for example, various features of the vehicle based Li-Fi communication system 110 or wireless device 130). In one aspect, data for use in accordance with aspects of the present disclosure is, for example, input and/or accessed by accessors 660, 662 via terminals 642, 666, such as personal computers (PCs), minicomputers, mainframe computers, microcomputers, telephonic devices, or wireless devices, such as personal digital assistants ("PDAs") or a hand-held wireless devices coupled to a server 643, such as a PC, minicomputer, mainframe computer, microcomputer, or other device having a processor and a repository for data and/or connection to a repository for data, via, for example, a network 644, such as the Internet or an intranet, and couplings 645, 646, 664. The couplings 645, 646, 664 include, for example, wired, wireless, or fiber optic links. In another example variation, the method and system in accordance with aspects of the present disclosure operate in a stand-alone environment, such as on a single terminal.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method of light fidelity ("Li-Fi") communication, comprising:
   determining an event associated with a vehicle;
   generating, based upon the determined event, a Li-Fi communication specific to a location within the vehicle, comprising information based on an operational characteristic of the vehicle; and
   sending, to a wireless device, the generated Li-Fi communication;
   wherein the wireless device generates, based upon the received Li-Fi communication and a selection on the wireless device by a user, additional information regarding the operational characteristic of the vehicle, and displays the additional information.

2. The method of claim 1, wherein generating the additional information further comprises obtaining the additional information from a remote server.

3. The method of claim 1, wherein the wireless device comprises at least one of a cellular phone, a smart phone, a session initiation protocol ("SIP") phone, a laptop, a personal digital assistant ("PDA"), a satellite radio, a global positioning system, a multimedia device, a video device, a digital audio player, a camera, a game console, a tablet, a smart device and a wearable device.

4. The method of claim 3, wherein the wireless device is a wearable device, and the wearable device comprises a near eye display.

5. The method of claim 1, wherein the determined event is operation of the vehicle, and the additional information displayed comprises tutorials or live diagnostic data based on controllers sending the Li-Fi communication.

6. The method of claim 1, wherein the determined event is a fault within the vehicle, and the additional information displayed comprises at least one of information from social media regarding the fault, vehicle dealer information regarding the fault, and a determination of operability of the vehicle, based on an instrument panel sending the Li-Fi communication.

7. A light fidelity ("Li-Fi") vehicle communication system, comprising:
 a plurality of vehicle monitors that are operable to monitor respective components of a vehicle;
 a wireless communications interface;
 a memory; and
 a processor communicatively coupled to the wireless communications interface and the memory, the processor configured to:
 determine, from at least one of the plurality of vehicle monitors, an event associated with the vehicle;
 generate, based upon the determined event, a Li-Fi communication specific to a location within the vehicle, comprising information based on an operational characteristic of the vehicle; and
 send, to a wireless device, the generated Li-Fi communication;
 wherein the wireless device generates, based upon the received Li-Fi communication and a selection on the wireless device by a user, additional information regarding the operational characteristic of the vehicle, and displays the additional information.

8. The system of claim 7, wherein the generating additional information further comprises obtaining the additional information from a remote server.

9. The system of claim 7, wherein the wireless device comprises at least one of a cellular phone, a smart phone, a session initiation protocol ("SIP") phone, a laptop, a personal digital assistant ("PDA"), a satellite radio, a global positioning system, a multimedia device, a video device, a digital audio player, a camera, a game console, a tablet, a smart device and a wearable device.

10. The system of claim 9, wherein the wireless device is a wearable device, and the wearable device comprises a near eye display.

11. The system of claim 7, wherein the determined event is operation of the vehicle, and the additional information displayed comprises tutorials or live diagnostic data based on controllers sending the Li-Fi communication.

12. The system of claim 7, wherein the determined event is a fault within the vehicle, and the additional information displayed comprises at least one of information from social media regarding the fault, vehicle dealer information regarding the fault, and a determination of operability of the vehicle, based on an instrument panel sending the Li-Fi communication.

13. A non-transitory computer readable medium storing computer executable instructions for light fidelity ("Li-Fi") communication, comprising instructions to:
 determine an event associated with a vehicle;
 generate, based upon the determined event, a Li-Fi communication specific to a location within the vehicle, comprising information based on an operational characteristic of the vehicle; and
 send, to a wireless device, the generated Li-Fi communication;
 wherein the wireless device generates, based upon the received Li-Fi communication and a selection on the wireless device by a user, additional information regarding the operational characteristic of the vehicle, and displays the additional information.

14. The non-transitory computer readable medium of claim 13, wherein the generating additional information further comprises obtaining the additional information from a remote server.

15. The non-transitory computer readable medium of claim 13, wherein the wireless device comprises at least one of a cellular phone, a smart phone, a session initiation protocol ("SIP") phone, a laptop, a personal digital assistant ("PDA"), a satellite radio, a global positioning system, a multimedia device, a video device, a digital audio player, a camera, a game console, a tablet, a smart device and a wearable device.

16. The non-transitory computer readable medium of claim 15, wherein the wireless device is a wearable device, and the wearable device comprises a near eye display.

17. The non-transitory computer readable medium of claim 13, wherein the determined event is operation of the vehicle, and the additional information displayed comprises tutorials or live diagnostic data based on controllers sending the Li-Fi communication.

18. The non-transitory computer readable medium of claim 13, wherein the determined event is a fault within the vehicle, and the additional information displayed comprises at least one of information from social media regarding the fault, vehicle dealer information regarding the fault, and a determination of operability of the vehicle, based on an instrument panel sending the Li-Fi communication.

* * * * *